United States Patent [19]
Karlsson

[11] Patent Number: 5,542,619
[45] Date of Patent: Aug. 6, 1996

[54] FISHING REEL OF THE MULTIPLIER TYPE

[75] Inventor: Jarding Karlsson, Mörrum, Sweden

[73] Assignee: ABU AB, Svängsta, Sweden

[21] Appl. No.: 352,166

[22] Filed: Dec. 1, 1994

[51] Int. Cl.$^6$ ............................................. A01K 89/0155
[52] U.S. Cl. ........................ 242/289; 188/82.7; 188/184
[58] Field of Search ....................... 242/289; 188/82.7, 188/184

[56] References Cited

U.S. PATENT DOCUMENTS

| | | | |
|---|---|---|---|
| 3,477,659 | 11/1969 | Morritt | 242/289 |
| 3,944,160 | 3/1976 | Cooper | 242/289 |
| 4,919,362 | 4/1990 | Johansson | 242/289 |

*Primary Examiner*—Katherine Matecki
*Attorney, Agent, or Firm*—Browdy and Neimark

[57] ABSTRACT

A fishing reel of the multiplier type has a frame, a line spool rotatably mounted in the frame, a brake ring coaxial with the line spool and connected to the frame, and a friction brake device connected to the line spool and adapted, in cooperation with the brake ring, to brake spool rotation. The brake device comprises a carrier ring which is rotatable together with the line spool, is coaxial therewith and has at least one bearing pin parallel to the axis of rotation of the line spool and pivotally supporting a brake element for cooperating with the brake ring. The brake element is designed as a lever element and is freely pivotable within a narrow pivoting range about the bearing pin between a braking position, in which it engages the brake ring with one lever arm, and an off-position, in which it is disengaged from the brake ring, the brake element being so designed and dimensioned as to be maintained in its off-position upon acceleration of the line spool and, hence, of the carrier ring, and in its braking position upon deceleration of the line spool and, hence, of the carrier ring.

8 Claims, 4 Drawing Sheets

FIG._1

FISHING REEL OF THE MULTIPLIER TYPE

BACKGROUND OF THE INVENTION

The present invention relates to a fishing reel of the multiplier type.

Known fishing reels of this type have a frame and a line spool rotatably mounted in the frame. To prevent the spool, during casting, from rotating at such a high speed that the line cannot be paid out at the same rate but instead rises, forming a so-called birdnest, these prior-art fishing reels are equipped with a mechanical brake, usually a friction brake. The braking power of the friction brake can be adjusted by means of a turnable knob. To the same end, use is generally made of an additional brake in the form of a centrifugal brake.

The centrifugal brake consists of a ring non-rotatably connected to the line spool and having two diametrically opposed pins projecting radially outwards and each supporting a centrifugal weight which is slidable along the respective pin. During the rotation of the line spool, the centrifugal weights are urged radially outwards so as to engage the inner circumferential surface of a brake ring connected to the frame. During a cast, the rotational speed of the line spool increases rapidly to maximum speed during a relatively short, initial phase of acceleration to thereafter decrease during a longer phase of deceleration. The centrifugal brake is immediately actuated during a cast and thus produces a braking action commencing during the phase of acceleration. During this phase, there is however only a negligible risk of line rise, since it is the line, or more precisely the lure attached to it, that "pulls" the line spool, for which reason the line spool need not be subjected to braking during this phase. Braking the line spool during the phase of acceleration reduces the possibilities of making long casts. When the lure and the line are no longer "pulling" the line spool, i.e. during the phase of deceleration, it is however necessary to brake the line spool to prevent line rise.

SUMMARY OF THE INVENTION

The object of the present invention therefore is to provide a fishing reel overcoming this drawback, i.e. a fishing reel having brake means that does not brake the line spool during the initial phase of acceleration but during the following phase of deceleration.

According to the invention, this object is achieved by means of a fishing reel of the multiplier type comprising a frame, a line spool rotatably mounted in the frame, a brake ring coaxial with the line spool and connected to the frame, and friction brake means connected to the line spool and adapted, in cooperation with the brake ring, to brake spool rotation, said brake means comprising a carrier ring which is rotatable together with the line spool, is coaxial therewith and has at least one bearing pin parallel to the axis of rotation of the line spool and pivotally supporting a brake element for cooperating with the brake ring, said brake element being designed as a lever element having a first and a second lever arm and being freely pivotable within a narrow pivoting range about said bearing pin between a braking position, in which it engages the brake ring with said first lever arm, and an off-position, in which it is disengaged from the brake ring, said brake element being so designed and dimensioned as to be maintained in said off-position during acceleration of the line spool and, hence, of the carrier ring, and in said braking position during deceleration of the line spool and, hence, of the carrier ring.

In a preferred embodiment, the pivoting range of the brake element is limited, on the one hand, by the brake ring, which said first lever arm engages in said braking position, and, on the other hand, by a stop which is provided on the carrier ring and which said second lever arm of the brake element engages in said off-position. Preferably, said second lever arm is formed with a recess and the stop is so resiliently yieldable in the pivotal direction of the brake element that this element can be manually pivoted past its off-position to a locking position, in which said stop has snapped into said recess to lock the brake element, and manually pivoted back to said off-position.

Said first lever arm preferably has its center of gravity located ahead of the bearing pin, as seen in the direction of rotation of the line spool, the bearing pin being then suitably located on substantially the same line-spool radius as the center of gravity of said second lever arm of the brake element. Preferably, the center of gravity of said first lever arm is located radially outside the center of gravity of said second lever arm of the brake element.

Advantageously, the carrier ring may have a plurality of bearing pins evenly distributed in the circumferential direction of the carrier ring and each supporting one brake element.

BRIEF DESCRIPTION OF THE DRAWINGS

The invention will now be described in more detail with reference to the accompanying drawings.

DETAILED DESCRIPTION OF THE INVENTION

Figure 1:
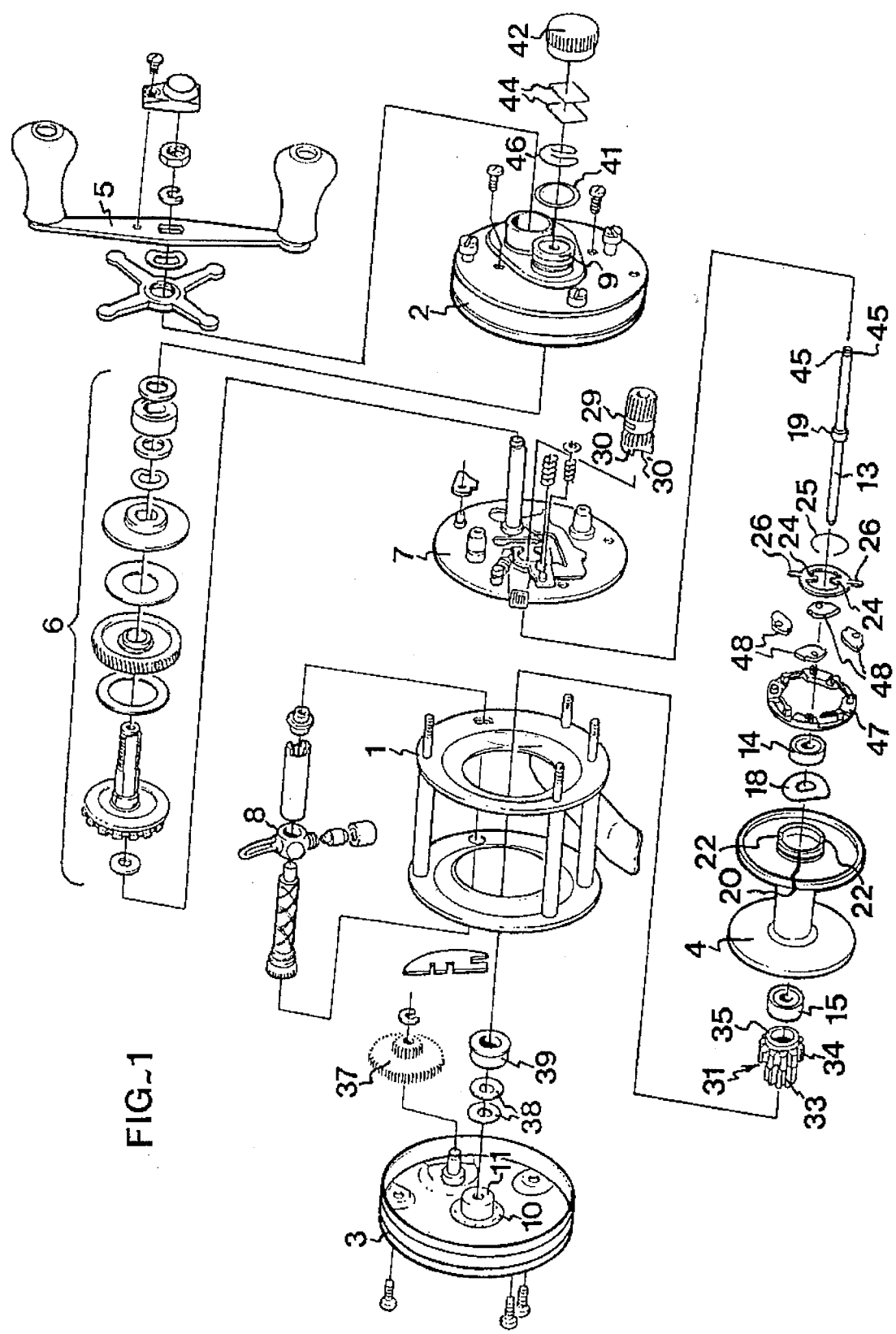
FIG. 1 is an exploded view showing a fishing reel according to the present invention.

The fishing reel of the multiplier type illustrated in the drawings has a frame 1 with detachable side plates 2 and 3, a spool 4 mounted in the frame 1 for receiving a fishing line (not shown), a handle 5 with an associated transmission mechanism 6 for rotating the line spool 4, a mounting plate 7 fixed on the frame 1 and supporting the handle 5 and the transmission mechanism 6, and a level-wind mechanism 8 mounted in the frame 1.

The handle 5 with the associated transmission mechanism 6, the mounting plate 7 and the other components supported thereby, as well as the level-wind mechanism 8 are all of conventional type and therefore will not be described in more detail here.

Figure 2:
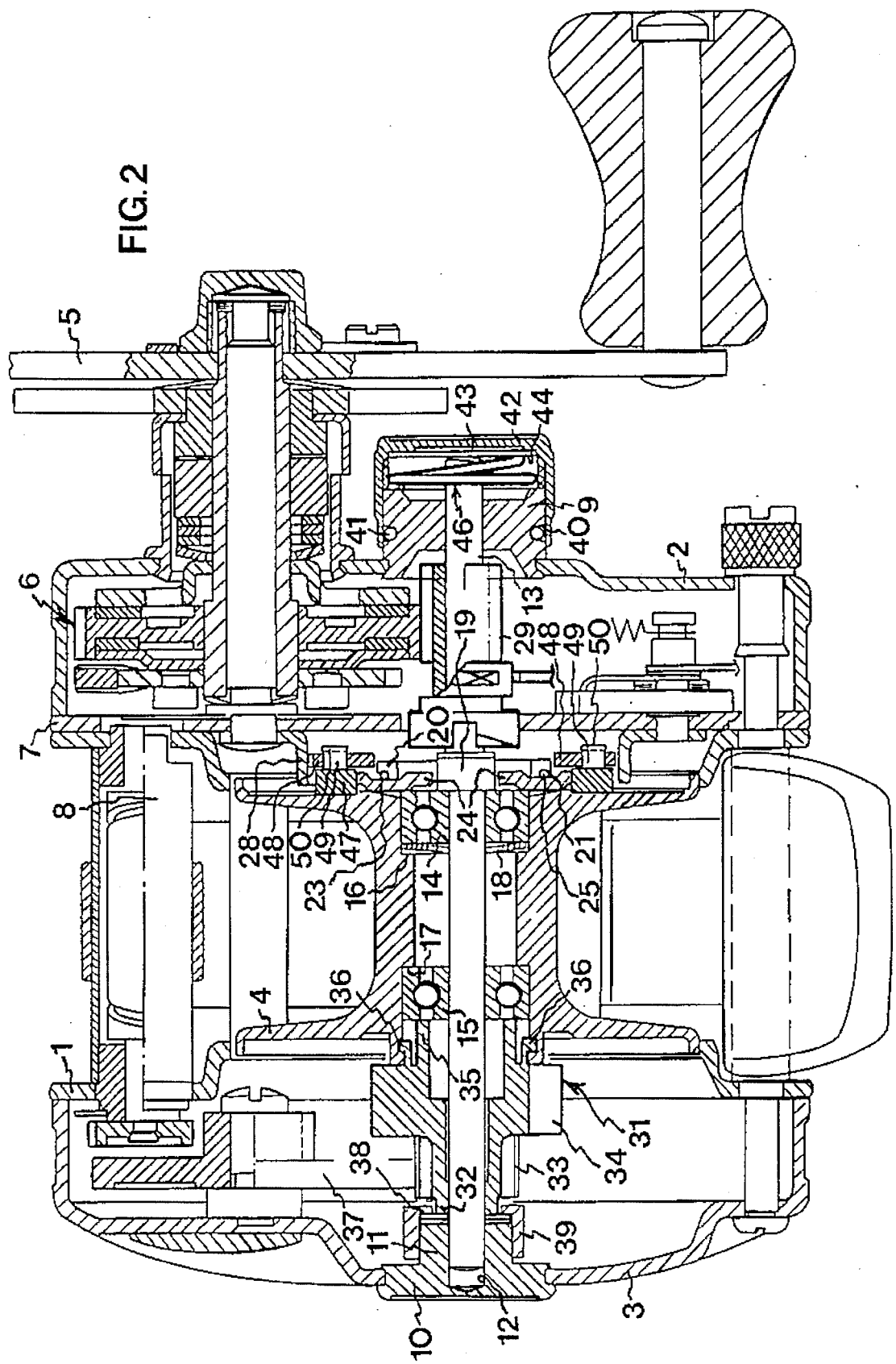
FIG. 2 is an enlarged longitudinal section of the fishing reel shown in FIG. 1.
Figure 3:
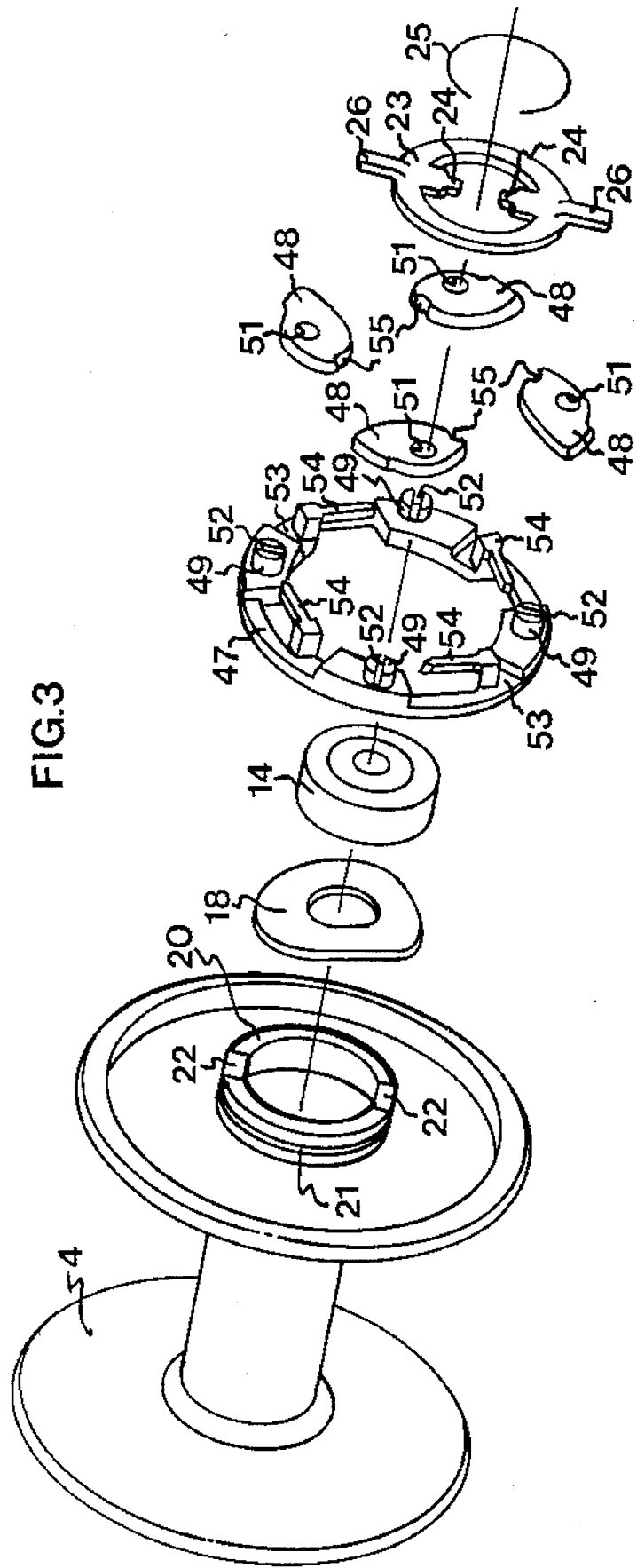
FIG. 3 is an enlarged exploded view showing components in a new brake.

The right side plate 2 has a central through opening in which a support bearing 9 is fixed. The support bearing 9 is in the form of an externally threaded sleeve projecting from the outside of the side plate 2. The left side plate 3 also has a central through opening in which a support bearing 10 is fixed. The bearing 10 has an axial projection 11 which extends inwardly and has a blind bore 12, the diameter of which is equal to the inner diameter of the bearing sleeve 9. The two support bearings 9 and 10 support the line spool shaft 13 at both ends thereof. As appears from FIG. 2, the shaft 13 passes through the bearing 9. The diameter of the shaft 13 is slightly smaller than the inner diameter of the bearing sleeve 9 and the diameter of the blind bore 12.

The line spool 4 is rotatably supported on the shaft 13 by means of two ball bearings 14 and 15. The outer ring of each ball bearing 14 and 15 abuts with its inner end surface on a shoulder 16 and 17, respectively, within the spool. The outer ring of the right ball bearing 14 abuts on the shoulder 16 by the intermediary of a spring washer 18. The outer end surface of the left ball bearing 15 is located a certain distance inwardly of the left end surface of the line spool 4 while the outer end surface of the right ball bearing 14 is located on a level with the right end surface of the line spool 4. A radially projecting annular shoulder 19 formed on the shaft 13 bears on the outer end surface of the inner ring of the right ball bearing 14.

The line spool 4 has a ring 20 which is coaxial with the line spool and integrally formed therewith, and which projects axially from the right end surface of the spool. The ring 20 has an external circumferential groove 21 and two diametrically opposed recesses 22. A clutch ring 23 is provided on the ring 20 and has two radially inwardly projecting, diametrically opposed projections 24 engaging in the recesses 22 in the ring 20. The clutch ring 23 is maintained in place on the ring 20 by means of a snap ring 25 disposed in the circumferential groove 21 thereof. The clutch ring 23 further has two radially outwardly projecting, diametrically opposed pins 26. In a known fishing reel, the clutch ring 23 is part of a centrifugal brake, and its pins 26 each carry a centrifugal weight, which is slidable on the respective pin 26. When the line spool 4 rotates at a high speed, the centrifugal weights engage the inner circumferential surface of a brake ring 28 fixed on the left-hand side of the mounting plate 7.

It should here be pointed out that the fishing reel according to the present invention has no centrifugal weights disposed on the pins 26 of the clutch ring 23.

A gear wheel 29 connected to and driven by the handle 5 via the transmission mechanism 6 is mounted on the shaft 13 between the line spool 4 and the support bearing 9. The end of the gear wheel 29 facing the line spool 4 is cup-shaped, having two diametrically opposed lugs 30. When the angler starts turning the handle 5 for retrieving the line, the gear wheel 29 is moved to the left from the position shown in FIG. 2 in a known manner not described in more detail here, whereby the shoulder 19 of the shaft 13 is received in the cup of the gear wheel 29 and the lugs 30 are brought into driving engagement with the projections 24 of the clutch ring 23. In order to ensure that this driving engagement takes place in a reliable and uniform manner during the rotation of the gear wheel 29, each lug 30 is preceded by an inclined cam surface 30'. Upon continued rotation of the handle 5, the line spool 4 is rotated about the shaft 13.

A gear wheel unit 31 formed as a single piece is composed of a minor sleeve 32, a minor gear wheel 33, a major gear wheel 34 and a major sleeve 35. The sleeve 35 is inserted in the line spool 4 outside the left ball bearing 15 and is non-rotatably connected to the line spool 4 by means of splines (not shown). The sleeve 35 has two radially resilient projections 36 engaging in an inner circumferential groove in the line spool 4 and retaining the sleeve 35 axially therein. The minor gear wheel 33 meshes with a gear wheel 37 for driving the level-wind mechanism 8, and the major gear wheel 34 can be used, in a manner not shown in more detail, for providing a buzzer function.

A friction member 38, consisting of two friction washers of tin bronze, bears on the end surface of the axial projection 11 of the support bearing 10 and is retained thereon by a plastic cap 39 passed over the projection. The plastic cap 39 has a central opening in which the minor sleeve 32 of the gear wheel unit 31 is accommodated. The end surface of the sleeve 32 then engages the friction member 38.

The right support bearing 9 has an outer circumferential groove 40, in which an O-ring 41 is mounted. An internally threaded bearing cap 42 is screwed on the support bearing 9. The bearing cap 42 has an internal central recessed portion 43 in its bottom. Two spring leaves 44 of tin bronze bridging the recessed portion 43 are placed in the bearing cap 42.

In its end located in the bearing cap 42, the shaft 13 has two circumferential, diametrically opposed grooves 45, the bottoms of which are parallel to each other and form a flat on the shaft. A resilient member 46, which bears on the support bearing 9 and is urged against the inner circumferential surface of the bearing cap 42 to be non-rotatably retained therein, engages in the grooves 45 in the shaft 13 in order, by engaging the flat thereon, to retain the shaft 13 against rotation and, by pressing against the outer side wall of the grooves, to urge the shaft to the right, such that its right end bears on the bottom of the bearing cup 42 by the intermediary of the spring leaves 44.

As will have been appreciated, the braking effect of the friction member 38 is adjusted by means of the bearing cap 42. When the bearing cap 42 is screwed further onto the support bearing 9, it will shift the shaft 13 to the left against the action of the resilient member 46, the shoulder 19 on the shaft 13 urging the ball bearing 14 and hence the line spool 4 and the gear wheel unit 31 to the left, such that the sleeve 32 is pressed more firmly against the friction member 38, thus increasing the braking power thereof. Such an increase of the braking power may be required, for instance when a heavy lure attached to the line should be cast.

When the bearing cap 42 is slightly unscrewed for reducing the braking effect of the friction member 38, the shaft 13 is shifted to the right by the action of the resilient member 46.

The fishing reel described thus far is known, for example, from U.S. Pat. No. 4,919,362. The fishing reel according to the present invention differs from this known fishing reel in that the centrifugal weights have been replaced by a new brake, which will now be described in more detail.

The new brake consists of a carrier ring 47 and four friction brake elements 48 supported by the carrier ring 47. The ring 47 has four bearing pins 49 axially projecting from one side of the ring and evenly distributed along the circumference thereof, i.e. being mutually spaced 90°. Each pin 49 has circular cross-section and is provided at its free end with a head 50 (FIG. 2), whose diameter is slightly greater than that of the pin.

The brake elements 48 are punched from a thin sheet of textile or fabric bakelite. Each brake element 48 has a through hole 51, whose diameter is insignificantly greater than the diameter of the pins 49. Each brake element 48 is pivotally mounted on a pin 49 and retained thereon by the pin head 50.

Each pin 49 has an axial slot 52 enabling such elastic compression of the pin that it can be inserted in the hole 51 in the corresponding brake element 48.

The inner diameter of the carrier ring 47 slightly exceeds the outer diameter of the clutch ring 23. The carrier ring 47, having two diametrically opposed grooves 53, is placed on the ring 20 of the line spool 4 and retained thereon by the clutch ring 23, whose radially projecting pins 26 engage in the grooves 53 of the carrier ring 47 and which, as described above, is held in place on the ring 20 by the snap ring 25. Hence, the carrier ring 47 is non-rotatably connected to the line spool 4 by means of the clutch ring 23 and the snap ring 25.

The carrier ring 47 has four resilient tongues 54 located on the same level as the pins 49 and extending in the circumferential direction of the carrier ring. The tongues 54 are oriented in the direction of rotation R of the line spool 4 (FIG. 4) and are placed, as seen in this direction, behind the associated bearing pin 49. The expression "direction of rotation R" of the line spool 4 as used herein and in the appended claims relates to the direction in which the line spool rotates during a cast, i.e. the direction contrary to the direction of line retrieve.

Figure 4:
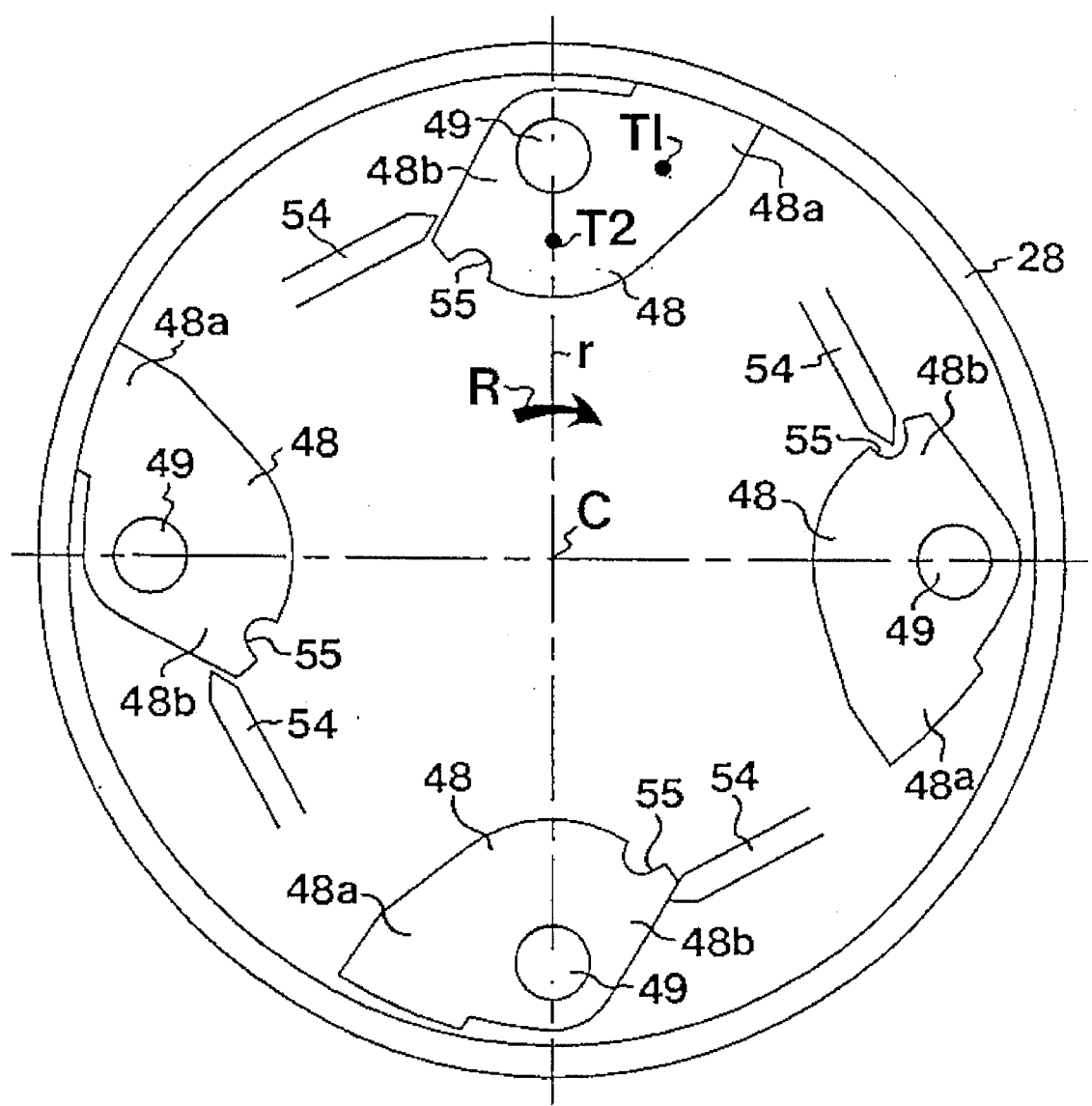
FIG. 4 is a schematic end view illustrating the function of the brake.

Each brake element 48 is designed as a lever element having (as seen in the direction of rotation R) a front lever arm 48a and a rear lever arm 48b and being freely pivotable, within a narrow pivoting range, about a respective bearing pin 49 between a braking position, in which the front lever arm 48a is in frictional engagement with the brake ring 28, and an off-position, in which the rear lever arm 48b engages the respective tongue 54 which then acts as a stop. In FIG. 4, the left and the upper brake element 48 are in their braking positions, and the lower brake element 48 is in its off-position.

Each brake element 48 has a recess 55 provided in the rear lever arm 48b. Each tongue 54 is so resiliently yield-able in the pivotal direction of the associated brake element 48 that the brake element can be manually pivoted past its off-position to a locking position, in which the apex of the tongue 54 has snapped into the recess 55 so as to lock the brake element, and can be manually pivoted back to its off-position. If one or more brake elements 48 need not be used for braking the line spool 4, it/they can be manually arrested in the locking position. In FIG. 4, the right brake element 48 is in its locking position.

Each brake element 48 is so designed and dimensioned as to be maintained in its off-position during the acceleration of the line spool 4 and thus of the carrier ring 47, e.g. during the initial phase of acceleration of a cast, and in its braking position during the deceleration of the line spool and thus of the carrier ring, e.g. during the phase of deceleration comprising the major part of the time of line pay-out. Moreover, each brake element 48 is so designed and dimensioned that it is held in its braking position when the line spool 4 and, hence, the carrier ring 47 are rotating at constant speed.

In the braking position, the front lever arm 48a of the brake element 48 is in frictional engagement with the brake ring 28, as shown for the left and the upper brake element in FIG. 4. In this Figure, the centers of gravity of the front and of the rear lever arm 48a and 48b, respectively, are designated T1 and T2, respectively, for the upper brake element 48. As appears, the center of gravity T2 of the rear lever arm 48b and the bearing pin 49 are located on substantially the same line-spool radius r. As also appears, the center of gravity T1 of the front lever arm 48a is located radially outside the center of gravity T2 of the rear lever arm 48b at substantially the same radial distance from the center C of the line spool 4 as the bearing pin 49.

When the line spool 4 and thus the carrier ring 47 are accelerated in the direction of the arrow R, the resultant torque exerted on each brake element 48, i.e. the sum of the torques resulting from the forces acting on the centers of gravity T1 and T2 (gravity, inertia and centrifugal force), is so directed as to maintain the brake element 48 in its off-position, while the resultant torque during deceleration and at constant speed of rotation is directed in the opposite direction so as to maintain the brake element 48 in its braking position.

During a cast, the brake elements 48 will therefore be in their non-braking off-position during the initial phase of acceleration to thereafter swivel over to their braking position during the subsequent phase of deceleration.

What is claimed is:

1. A fishing reel of the multiplier type comprising
a frame,
a line spool rotatably mounted in the frame,
a brake ring coaxial with the line spool and connected to the frame, and
friction brake means connected to the line spool, said brake means acting in cooperation with the brake ring for braking spool rotation,
said brake means comprising a carrier ring which is rotatable together with the line spool, is coaxial therewith and has at least one bearing pin parallel to the axis of rotation of the line spool and pivotally supporting a brake element for cooperation with the brake ring,
said brake element comprising a lever element having a first lever arm and a second lever arm and being freely pivotable within a narrow pivoting range about said bearing pin between a braking position, in which said brake element engages the brake ring with said first lever arm, and an off-position, in which it is disengaged from the brake ring, said brake element being so dimensioned as to be maintained in said off-position during acceleration of the line spool and, hence, of the carrier ring while rotating in an unwinding direction, and in said braking position during deceleration of the line spool and, hence, of the carrier ring while rotating in the unwinding direction.

2. The fishing reel as claimed in claim 1, wherein the pivoting range of the brake element is limited by the brake ring, which said first lever arm engages in said braking position, and by a stop which is provided on the carrier ring and which said second lever arm of the brake element engages in said off-position.

3. The fishing reel as claimed in claim 2, wherein said second lever arm is formed with a recess, and wherein said stop includes means for resiliently yielding in the pivotal direction of the brake element such that said brake element can be manually pivoted past its off-position to a locking position, in which said stop has snapped into said recess to lock the brake element, and manually pivoted back to its off-position.

4. The fishing reel as claimed in claim 1, wherein said first lever arm has its center of gravity located ahead of the bearing pin as seen in the direction of rotation of the line spool.

5. The fishing reel as claimed in claim 4, wherein the bearing pin and the center of gravity of said second lever arm of the brake element are located on substantially the same line-spool radius.

6. The fishing reel as claimed in claim 5, wherein center of gravity of said first lever arm is located radially outside the center of gravity of said second lever arm of the brake element.

7. The fishing reel as claimed in claim 4, wherein the center of gravity of said first lever arm is located radially outside the center of gravity of said second lever arm of the brake element.

8. The fishing reel as claimed in claim 1, wherein the carrier ring has a plurality of the bearing pins evenly distributed in the circumferential direction of the carrier ring and each supporting one brake element.

* * * * *